United States Patent [19]

Snyder et al.

[11] Patent Number: 4,593,445
[45] Date of Patent: Jun. 10, 1986

[54] APPARATUS AND PROCESS FOR REFURBISHING VALVES

[75] Inventors: David A. Snyder, N. Huntingdon Township, Westmoreland County, Pa.; David M. Glosecki, Taylor Springs, Ill.

[73] Assignee: Westinghouse Electric Corp., Pittsburgh, Pa.

[21] Appl. No.: 670,774

[22] Filed: Nov. 13, 1984

[51] Int. Cl.$^4$ .................. B21D 53/00; B23K 9/04; B23P 6/00; B23Q 15/00

[52] U.S. Cl. .................. 29/157.1 R; 29/402.07; 29/402.18; 29/527.6; 29/703; 29/720; 219/61; 219/76.14; 219/117.1; 219/124.31; 219/124.33; 219/125.11; 228/102; 228/103; 228/119; 228/162

[58] Field of Search ............ 29/157.1 R, 402.07, 29/402.18, 527.6, 723, 703, 720; 228/102, 103, 119, 162; 219/60 A, 61, 76.1, 76.14, 124.1, 124.31, 124.33, 125.1, 125.11, 117.1; 118/620; 427/37

[56] References Cited

U.S. PATENT DOCUMENTS

| | | | |
|---|---|---|---|
| 2,044,950 | 6/1936 | Mellinkoff | 29/157.1 R |
| 3,275,795 | 9/1966 | Bosna et al. | 219/125.11 |
| 3,627,973 | 12/1971 | Smith | 219/125.1 X |
| 3,689,979 | 9/1972 | Palat | 29/157.1 R |
| 4,160,895 | 7/1979 | Hopper | 219/125.1 |
| 4,215,809 | 8/1980 | Davis | 228/119 X |
| 4,357,515 | 11/1982 | Kiefer et al. | 219/60 A X |
| 4,486,938 | 12/1984 | Hext | 29/402.07 X |
| 4,514,443 | 4/1985 | Kostecki | 219/76.14 X |
| 4,527,039 | 7/1985 | Füwesi | 219/76.1 X |
| 4,531,039 | 7/1985 | Okano et al. | 219/125.1 X |

Primary Examiner—Mark Rosenbaum
Assistant Examiner—Ronald S. Wallace
Attorney, Agent, or Firm—L. A. DePaul

[57] ABSTRACT

An apparatus and a method for remotely refurbishing valve seats are disclosed herein. The apparatus generally comprises a welding assembly having a welding head for depositing a bead of metal around the valve seat, and a positioning assembly detachably mountable onto the valve body for angularly and radially moving the welding head around the valve seat at a selected point along the axis of rotation of the seat. Additionally, the apparatus includes a control means operatively connected to the positioning assembly for controlling the movement of the welding head around the valve seat. In operation, the control means, which may include a microprocessor, first angularly moves the welding head 360° around the circumference of the valve seat, then moves the welding head to a different point along the axis of rotation of the valve seat, and then rotates the welding head 360° around the valve seat again for as many cycles as is necessary to rebuild the valve seat. The resulting deposit of metal beads is finally ground down into a desired contour. Both the apparatus and the process of the invention are particularly useful in refurbishing the seats of valves located in areas of limited accessibility, such as the governor valves in the steam chest of a turbine generator.

36 Claims, 10 Drawing Figures

APPARATUS AND PROCESS FOR REFURBISHING VALVES

BACKGROUND OF THE INVENTION

1. Field of the Invention

This invention relates to both an apparatus and a process for refurbishing the seat of a valve, and is particularly concerned with refurbishing the valve seats in the steam chest of a turbine generator.

2. Description of the Prior Art

Methods for on-site refurbishment of valve seats are known in the prior art. Such refurbishments must be regularly performed on the valve seats present in the steam chests of turbine generators. The seats of such valves suffer constant exposure to high-pressure steam, as well as frequent impacts from the valve element. The cracks which result in the seats of such valves must be repaired, on the steam chest will in time become ineffective in its ultimate purpose, which is to selectively direct high-pressure steam through the various openings in a manifold-like structure.

One prior art method for the refurbishment of the valve seats in such steam chests consists of the steps of removing the stem and interior mechanism of the governor valve, manually grinding off the sealing layer of metal from the valve seat to be refurbished, manually depositing a new layer of sealing metal around the ground valve seat by means of an arc welder, and then machining the excess metal from the welded deposit of metal until the final desired contour of the rebuilt valve seat is achieved. Typically, all of these grinding and welding steps are carried out by conventional grinding and welding tools which are inserted through the valve stem bore and manipulated by means of makeshift extenders such as broom handles or the like.

Unfortunately, such prior art refurbishing techniques are accompanied by many shortcomings. For example, such procedures are labor-intensive, and hence costly, since a skilled human operator is required at every point in the grinding and welding steps. Additionally, the manipulation of a conventional arc welder through the valve stem bore by means of a makeshift extender renders the operation slow and awkward, and makes it difficult (if not impossible) to uniformly deposit a new sealing layer of metal around the valve seat. Any non-uniformities in this deposit of metal can adversely affect the quality of the resulting refurbished valve seat, which in turn could necessitate more frequent refurbishments.

Clearly, there is a need for both an apparatus and a process for refurbishing the seats of such valves which is inexpensive, convenient and reliable in use. Ideally, such an apparatus and process should minimize the amount of labor necessary to successfully produce a high-quality refurbished valve seat in order to minimize the number of refurbishments necessary over the life of the steam chest.

SUMMARY OF THE INVENTION

In its broadest sense, the invention is both an apparatus and a process for remotely refurbishing valve seats. The invention is particularly useful in refurbishing seats of valves to which access is limited, such as the control valves of a steam chest. The apparatus generally comprises a welding assembly including both a welding head for depositing metal around an annular valve seat, and a positioning assembly which is mountable onto the body of the valve for angularly, axially and radially moving the welding head around the contour of the valve seat at a selected point along the axis of rotation of the seat. The apparatus further includes a control means operatively connected to the positioning assembly for controlling the movement of the welding head around the circumference of the valve seat.

The positioning assembly may include a rotatable shaft which is aligned with and movable along the axis of rotation of the valve seat, and a radial adjustment assembly which connects the welding head to the shaft for radially moving the welding head relative to the valve seat. The positioning assembly may further include a source of electrically operated motive power in the form of electric motors which are operatively connected to both the shaft and the radial adjustment assembly. The control means may include a microprocessor which is electrically connected to the source of electrically operated motive power for remotely controlling the manner in which the positioning means moves the welding head around the circumference of the valve seat.

The apparatus of the invention may further include a universal mounting means for detachably mounting the welding assembly onto the body of the valve. When the body of the valve includes a valve stem connector, the universal mounting means is preferably attachable to the connector. In the preferred embodiment, the mounting means includes a vitrolic coupling for detachably connecting the welding assembly to the valve body.

Finally, the apparatus of the invention may include a machining assembly having a drive unit for driving a shaft, and first and second machining heads, each of which is detachably connectable to the shaft. The drive unit is preferably also detachably connectable to the mounting means by a vitrolic coupling. The first machining head may be used to grind down the valve seat prior to the welding operation, while the second machining head may be used to grind off excess metal from the plurality of beads deposited around the circumference of the valve seat by the welding head. In the preferred embodiment, each of the machining heads is a frustro-conical bit having a plurality of fluted grooves, each of which is tipped at an angle which tends to pull the resulting metal chips away from the valve seat when the machining head is applied to the valve seat.

The invention further includes a process for refurbishing valve seats which generally comprises the steps of disassembling the valve to provide access to the valve seat, attaching a mounting means onto the valve stem connector, detachably mounting a machining assembly onto the mounting means, grinding down the valve seat with a machining head of the machining assembly, and detachably mounting the welding assembly onto the body of the valve. After this is accomplished, a plurality of overlapping metal beads may be deposited around the valve seat by angularly moving the welding head through an arc of 360°, angularly moving the welding head back to the original position, moving the welding head to a different point along the axis of rotation of the valve seat, and again rotating the welding head 360° along the circumference of the valve seat by the welding assembly. The process of the invention may further include the steps of removing impurities from the metal beads as they are being deposited around the circumference of the valve seat, and grinding off any excess metal present in the resulting deposit of overlapping beads in order to achieve the desired final contour of the valve seat.

DETAILED DESCRIPTION OF THE PREFERRED EMBODIMENT

General Description of the Purpose, Structure and Operation of the Invention

Figure 1:
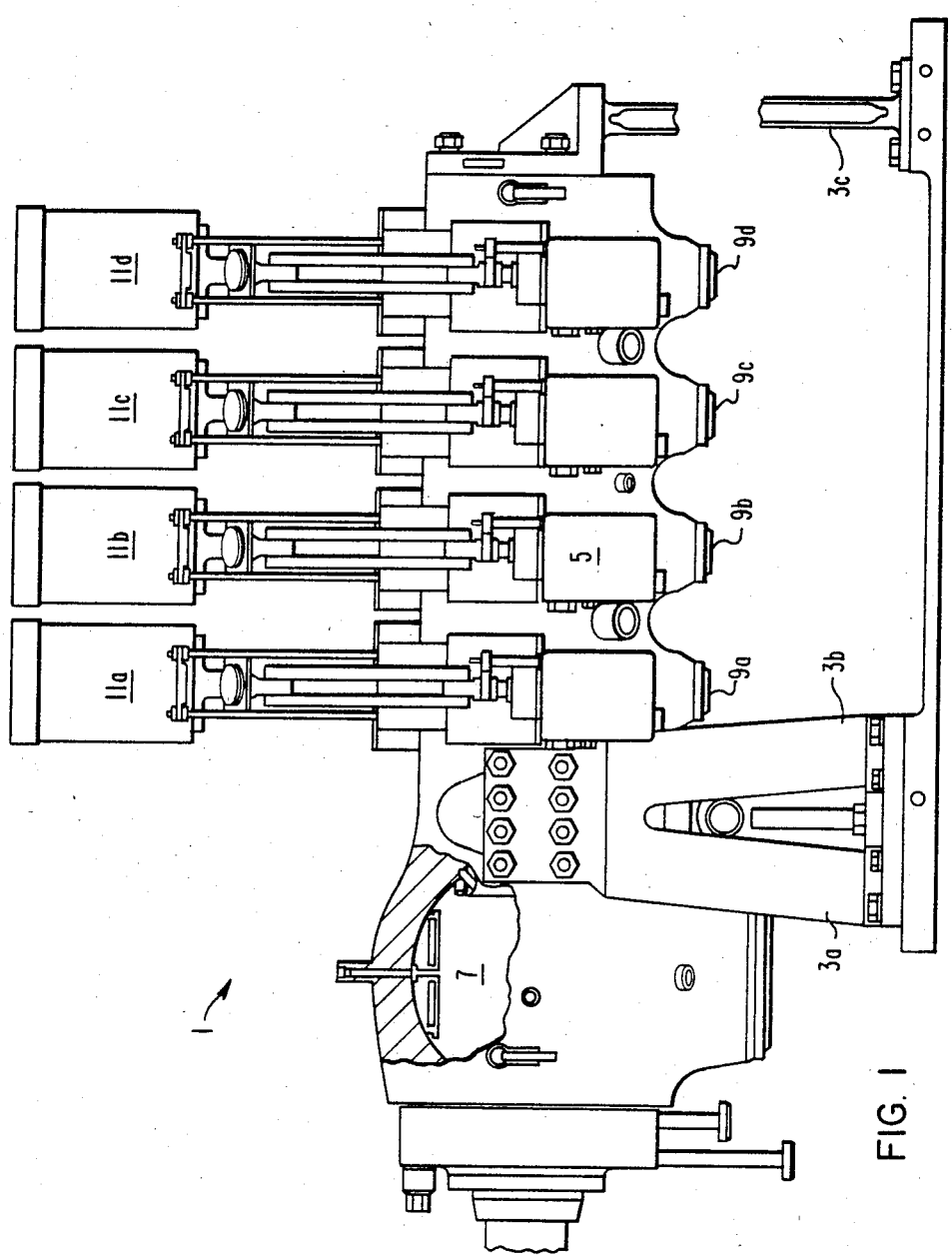
FIG. 1 is a partial cross-sectional side view of a steam chest used in a steam turbine system.
Figure 2:
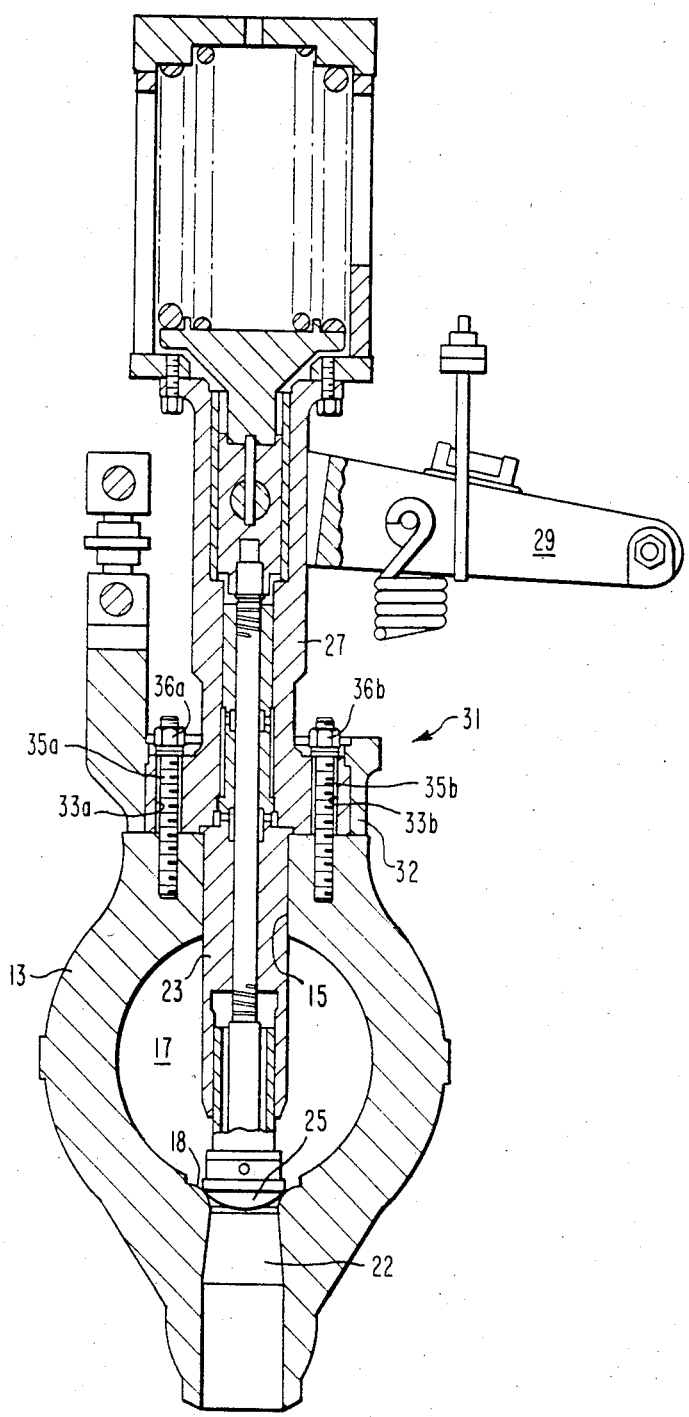
FIG. 2 is a cross-sectional end view of the steam chest of FIG. 1 illustrating the valve stem, the valve body, valve chamber and valve seat of any one of the governor valves of the steam chest.

With reference now to FIGS. 1 and 2, wherein like numerals designate like components throughout all of the several figures, the overall purpose of the invention is to conveniently and reliably refurbish the seats 18 of valves 11a, 11b, 11c and 11d by means of a machining assembly 70 and a welding assembly 140, each of which is detachably mountable over the bore 15 of the valve after its internal valve mechanism has been removed. While the purpose, structure and operation of the invention are explained hereinafter in the context of the refurbishment of the valve seats 18 in the steam chest 1 of a turbine generator, it should be borne in mind that the invention may be used to refurbish almost any circular valve seat in any valve.

With specific reference now to FIG. 1, the steam chests 1 of such turbine generators generally include a plurality of columnar members 3a, 3b and 3c for supporting a manifold body 5 having a single steam inlet chamber 7, and four downwardly directed steam outlet ports 9a, 9b, 9c and 9d. The manifold body 5 further includes four governor valves 11a, 11b, 11c and 11d for directing a flow of steam from the steam inlet chamber 7 to a selected one of the steam outlet ports 9a, 9b, 9c or 9d, respectively.

With specific reference now to FIG. 2, each of the governor valves 11a, 11b, 11c and 11d generally includes a valve body 13 (which is a portion of the previously mentioned manifold body 5), a valve stem bore 15, a valve chamber 17 which communicates with the valve stem bore 15, and an annular valve seat 18. The valve seat 18 melds in with a steam nozzle 22 which in turn communicates with the previously mentioned steam outlet port 9a. Each of the governor valves 11a, 11b, 11c and 11d further includes a removable valve stem 23 which terminates in a spring-loaded valve element 25 having a convex face which is capable of sealingly engaging the valve seat 18. The valve steam 23 further includes a stem plunger assembly 27 which is operatively connected to a spring-biased lever arm 29 for selectively reciprocating the valve stem 23 through the stem bore 15 so that the convex valve element 25 selectively engages the annular shoulder of the valve seat 18. The valve stem 23 is attached to the upper portion of the valve body 13 by means of a valve stem connector 31. Connector 31 includes an annular flange 32 having a plurality of bores 33a, 33b for receiving a plurality of studs 35a, 35b extending upwardly from the valve body 13. While only two bores and two studs are shown in FIG. 2, it will be appreciated that the annular flanges 32 of such valve stem connectors 31 typically include between six and eight bores 33 for receiving the same number of studs 35. Once the annular flange 32 of the valve stem connector 31 has been positioned so that all of the studs 35a, 35b register with and extend completely through their respective bores 33a, 33b, the final connection between the valve stem 23 and the valve body 13 is made by means of nuts 36a, 36b threadedly engaged on the ends of studs 35a, 35b as indicated in FIG. 2.

Figure 6:
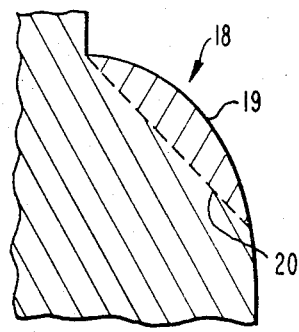
FIG. 6 is a cross-sectional side view of a portion of the valve seat of one of the governor valves illustrated in FIG. 2.

With specific reference now to FIGS. 2 and 6, the annular shoulder of the valve seat 18 generally includes a sealing layer 19 formed from hard, 12% chromium steel which overlies and is supported by a support shoulder 20 formed from softer chromium steel. As will be appreciated by those having ordinary skill in the turbine generator arts, the chromium steel sealing layer 19 of the valve seat 18 undergoes a considerable amount of mechanical stress and shock as the convex valve element 25 is forcefully reciprocated against the seat 18 in order to admit or shut off a flow of superheated, high-pressure steam through the valve nozzle 22. Over time, these shocks and stresses will cause cracks to form in the sealing layer 19. When these cracks are oriented along the profile of the annular shoulder of the valve seat 18, the superheated, high-pressure steam which is always present within the valve chamber 17 can leak through to the valve nozzle 22 even when the convex valve element 25 is tightly engaged around the valve seat 18. While the amount of steam leakage through the nozzle 22 and the steam outlet port 9a may at first be negligible, the stream of steam which constantly flows through such a crack will quickly widen a small crack into a larger and deeper crack. If left unattended, such a crack can eventually deepen until it cuts completely through the sealing layer 19 of hardened chromium steel and begins to attack the softer chromium steel which forms the support shoulder 20. Such cracks in the valve seats 18 can eventually reduce the effectiveness of the governor valve 11 in shutting off the steam flow through its respective outlet port 9 to a point where the operation of the steam chest 1 as a whole becomes severely degraded.

As is described in more detail hereinafter, the preferred embodiment of the invention generally comprises a machining assembly 70 and a welding assembly 140 for grinding out the cracked or damaged valve seat 18 and replacing it with a structure formed from a plurality of overlapping beads of metal which are welded to one another by means of a welding head 223 having an arc welder 224. The welding assembly 140 includes a positioning assembly 142 capable of accurately moving the welding head 223 angularly, axially and radially. Additionally, the positioning assembly 142 may be either manually controlled through the use of fiberscopic monitoring techniques, or it may be microprocessor-controlled. Finally, in order to expedite the refurbishing operation, the invention includes a universal mounting means 40 which is attachable to the valve stem connector 31 of the governor valve 11a, 11b, 11c or 11d, and which includes a vitrolic coupling for easily and conveniently detachably connecting the machining assembly 70 and the welding assembly 140 into the valve stem bore 15 of any of the governor valves 11a, 11b, 11c or 11d.

Specific Description of the Structure and Operation of the Invention

Figure 3A:
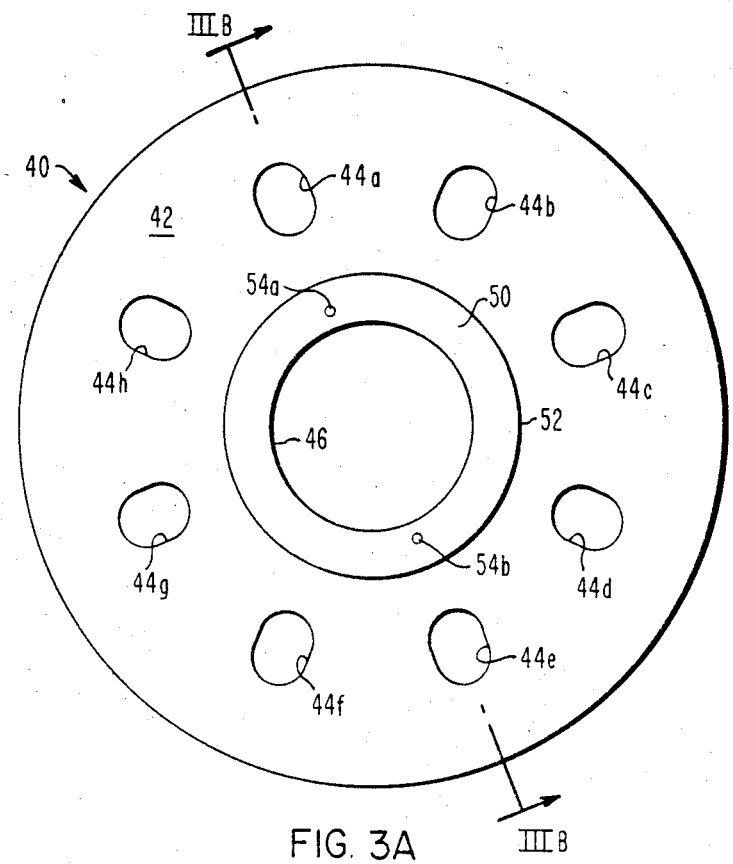
FIG. 3A is a plan view of the universal mounting means used to mount the machining and welding assemblies of the invention onto the steam chest.
Figure 3B:
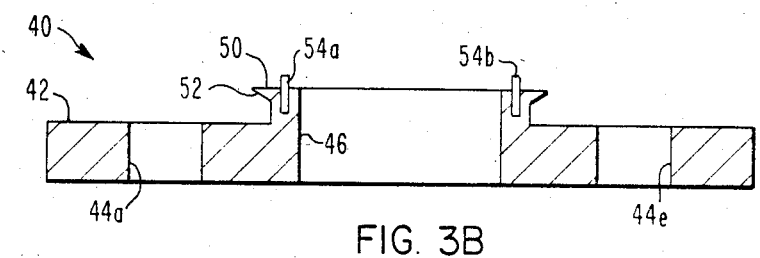
FIG. 3B is a cross-sectional side view of the universal mounting means illustrated in FIG. 3A.

With reference now to FIGS. 3A and 3B, the universal mounting means 40 of the invention includes a plate member 42 having a plurality of stud-receiving bores 44a-44h. Bores 44a-44h are registrable with the studs 35a, 35b, etc. used to secure the annular flange 32 of the valve stem connector 31 onto the valve body 13. In the preferred embodiment, each of the stud-receiving bores 44a-44h is elongated along the radial axis of the plate member 42, for a purpose which will be explained presently. The plate member 42 includes a centrally disposed, circular opening 46 (which is preferably of the same diameter as the valve stem bore 15) for receiving the cylindrical alignment skirts 90 and 164 of the machining assembly 70 and the welding assembly 140, respectively. Part of a vitrolic coupling 48 circumscribes the circular opening 46 of the plate member 42. Specifically, a circular flange 50 having a tapered rim 52 surrounds the circumference of the circular opening 46. This circular flange 50 includes a pair of alignment pins 54a, 54b spaced 180° apart for positioning the housing of either the machining assembly 70 or the welding assembly 140 in proper angular alignment with the plate member 42 prior to the fastening of the vitrolic coupling 48.

Figure 4:
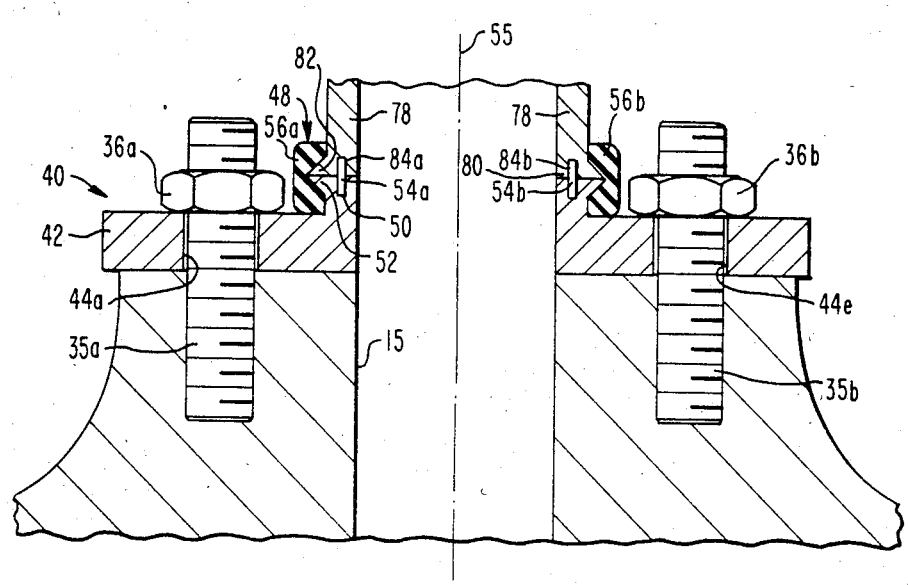
FIG. 4 is a cross-sectional side view of the mounting assembly of the invention, illustrating how the housings of the machining and welding assemblies are detachably mounted onto the universal mounting means.

FIG. 4 illustrates how the mounting means 40 detachably connects the housing 78 of the machining assembly 70 to the valve body 13. To complete the vitrolic coupling 48 between the plate member 42 and the housing 78 of the machining assembly 70, the housing 78, like the plate member 42, includes a circular flange 80 having a tapered rim 82. Additionally, the circular flange 80 of the housing 78 includes a pair of pin-receiving bores 84a, 84b which are registrable with the previously mentioned alignment pins 54a, 54b on the circular flange 50 of the plate 42. Once the alignment pins 54a, 54b have been inserted within the bores 84a, 84b, the vitrolic coupling 48 between the housing 78 and the plate member 42 is completed by the attachment of a pair of semicircular clamp members 56a, 56b around the tapered rims 52 and 82 of the flanges 50 and 80 of the plate member 42 and housing 78, respectively. The two semicircular clamping members 56a, 56b are attached together by means of nuts and bolts (not shown). As is evident from FIG. 4, the inner surfaces of the semicircular clamping members 52a, 52b includes a groove which is complementary in shape to the abutting tapered rims 52 and 82 of the plate member 42 and housing 78, respectively. While the foregoing description has been confined to the vitrolic coupling 48 between the plate member 42 of the universal mounting means 40 and the housing 78 of the machining assembly 70, it should be noted that the structure of the vitrolic coupling 48 between the plate member 42 and the housing 152 of the welding assembly 140 is exactly the same.

Figure 5:
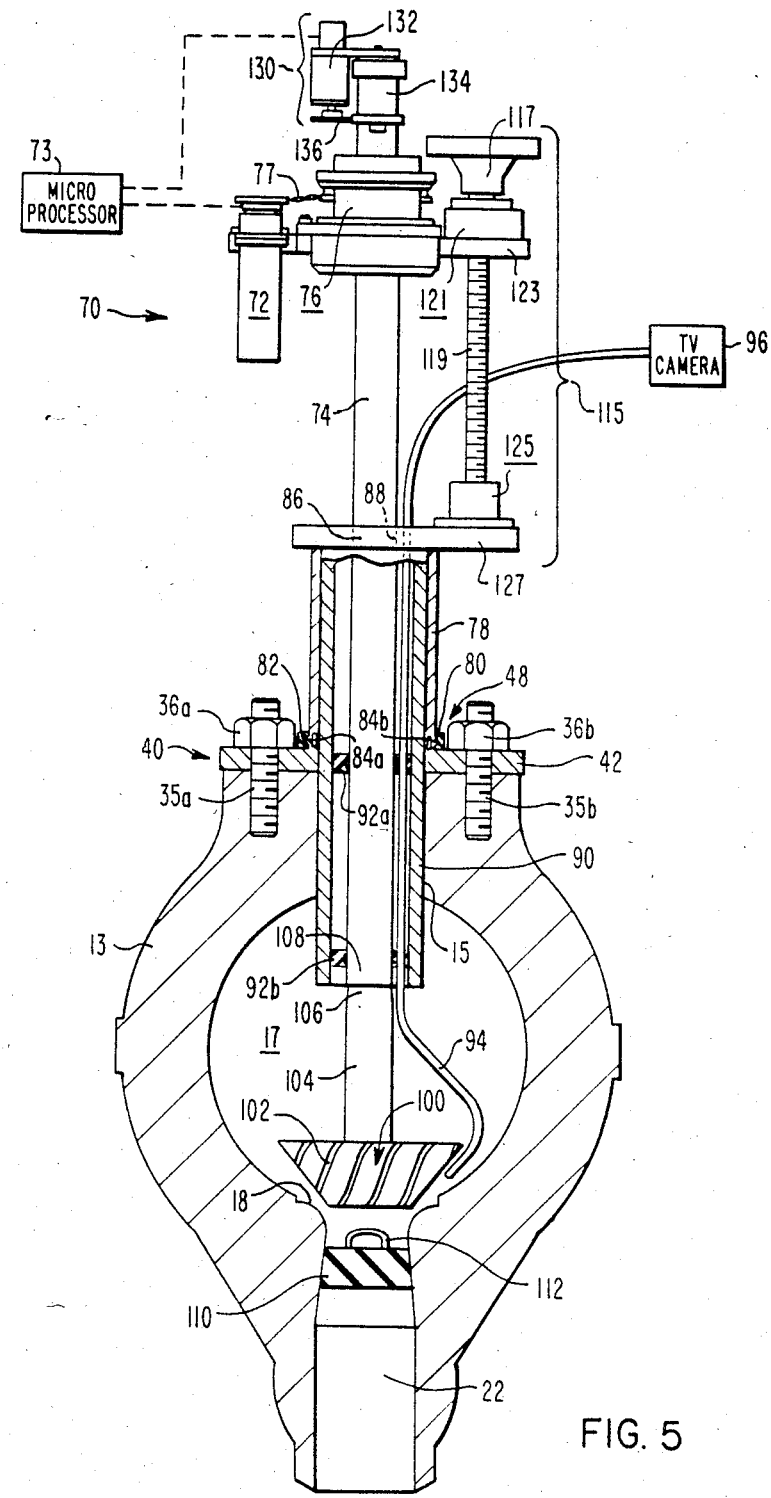
FIG. 5 is a partial cross-sectional side view of the machining assembly of the invention.

With reference now to FIG. 5, the machining assembly 70 of the invention generally includes a drive motor 72 which is electrically connected to a microprocessor 73 by means of a cable, and mechanically connected to a driveshaft 74 through a transmission 76. A chain drive 77 mechanically links the output of the drive motor 72 with the input gear of the transmission 76. The housing 78 of the machining assembly 70 is a generally cylindrical structure which receives the driveshaft 74 in the manner illustrated. The bottom end of the housing 78 includes the previously discussed circular flange 80 having a tapered rim 82 for forming the other half of the vitrolic coupling 48. The top end of the housing 78 includes a table 86 having a bore 88 through which the driveshaft 74 freely extends. Concentrically disposed within the housing 78 is a cylindrical alignment skirt which is receivable within the circular opening 46 of the universal mounting means 40, and the stem bore 15 of the valve body 13. The general purpose of the cylindrical alignment skirt 90 is to maintain the driveshaft 74 of the machining assembly 70 in accurate alignment with the center line 55 of the annular valve seat 18. To this end, the cylindrical alignment skirt 90 includes a pair of bearings 92a, 92b positioned along its longitudinal axis. In the preferred embodiment, these bearings 92a, 92b are low-friction ball bearings which are capable of rollingly engaging the shaft 74 both angularly and axially, in order that the shaft 74 may freely rotate and reciprocate during the grinding operation. Finally, the cylindrical alignment skirt 90 includes a fiberscope 94 disposed between the annular space between the driveshaft 74 and the inner wall of the skirt 90. As indicated in FIG. 5, the input end of the fiberscope 94 is positioned in the region where the machining bit 100 engages the rounded annular shoulder of the valve seat 18, while the output end is optically coupled to a television camera 96. As will be described in more detail hereinafter, the provision of a fiberscope 94 helps the operator to place the machine bit 100 in a proper starting position relative to the rounded shoulder of the annular valve seat 18 before the drive motor 72 is actuated.

Turning now to the structure of the machining bit 100, bit 100 includes a plurality of fluted grooves 102 which are transversely disposed to the longitudinal axis of the driveshaft 74 as indicated. When the machining bit rotates and engages the annular valve seat 18, the transverse disposition of the fluted grooves 102 tends to deflect the resulting metallic chips and particles away from the valve seat 18. The machining bit 100 also includes a shank 104 which terminates in the male end of a Morse-type coupling 106 which is detachably connectable to a complementary female Morse-type coupling 108 present in the terminal end of the driveshaft 74.

Immediately below the valve seat 18 is a plug 110 formed from a heat-resistant resilient material. The purpose of the plug 110 is to block metallic chips and particles formed by either the machining or the welding process from falling down the valve nozzle 22 further into the steam outlet 9a. The plug 110 preferably includes a handle 112 so that the operator of the invention may conveniently remove the plug 110 from the valve nozzle 22 after the refurbishing operation has been completed.

The machining assembly 70 also includes a coarse vertical adjustment assembly 115 for manually placing the machine bit 100 in the proper general vicinity with respect to the annular valve seat 18, as well as a fine vertical adjustment assembly 130 which is used to implement the actual grinding process. The coarse vertical adjustment assembly 115 generally includes a manually operable hand wheel 117 which is engaged to a threaded rod 119. At its upper end, the threaded rod 119 is threadedly engaged to the rod receiver 121 which is connected to the transmission 76 by mounting plate 123. At its lower end, the threaded rod 119 is journalled within a rod bearing 125 mounted onto an extension 127 of the table 86 atop the housing 78. A clockwise, manual rotation of the hand wheel 117 will axially withdraw the driveshaft 74 and the machining bit 100 away from the annular valve seat 18, while a counterclockwise, manual rotation of the hand wheel 117 will axially extend the driveshaft 74 and the machining bit 100 toward the valve seat 18. It should be noted that the combination of the threaded rod 119, mounting plate 123, and table extension 127 form a torque-counteracting structure which insures that all of the torque generated by the drive motor 72 will be transmitted to the machining bit 100. The fine vertical adjustment assembly 130 includes an electric motor 132 which is engaged to a worm gear assembly 134 by way of a coupling gear 136. Worm gear assembly 134 may be any one of a number of commercially available components capable of extending a working shaft in a precise and controlled manner. As is indicated in FIG. 5, electric motor 132, like drive motor 72, is electrically connected to the output of microprocessor 73. As will be described in more detail hereinafter, once the system operator determines that the machine bit 100 is in the proper initial position by means of fiberscope 94, microprocessor 73 extends and withdraws the driveshaft 74 in conformance with a preprogrammed "electronic template" in order to automatically and completely grind away the sealing layer 19 of the valve seat 18 illustrated in FIG. 6.

Figure 7:
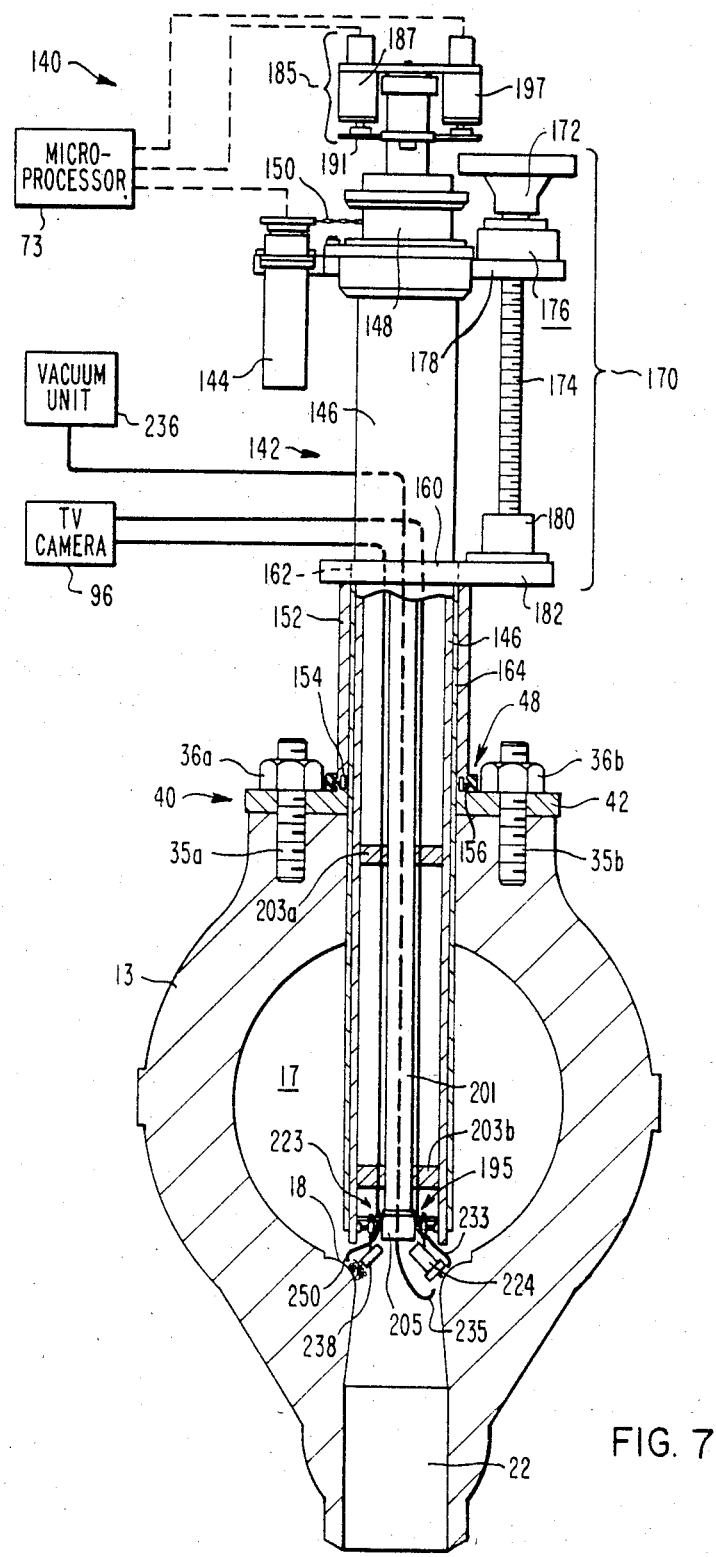
FIG. 7 is a partial cross-sectional side view of the welding assembly of the invention.

With reference now to FIG. 7, the welding assembly 140 generally includes a positioning assembly 142 for angularly, axially and radially positioning the arc welder 224 of a welding head 223. The positioning assembly 142 includes an angular adjustment motor 144 mechanically connected to a driveshaft 146 by way of transmission 148. The output of the motor 144 is linked to the input of the transmission 148 by means of a chain drive 150. The positioning assembly 142 further includes a generally cylindrical housing 152 through which the driveshaft 146 extends. Like the previously described housing 78 of the machining assembly 70, housing 152 includes a circular flange 154 having a tapered rim 156 at its bottom end for completing a vitrolic coupling 48 between the universal mounting means 40 and the welding assembly 140, and a table 160 having a bore 162 through which the driveshaft 146 extends at its top end. Additionally, housing 152 includes a cylindrical alignment skirt 164 which serves the same purpose as the previously described cylindrical alignment skirt 90 of the machining assembly 70. This skirt 164 is concentrically disposed within the housing 152, and is mounted on the bottom surface of the table 160 in the manner indicated in FIG. 7.

Further like machining assembly 70, welding assembly 140 includes a coarse vertical adjustment assembly 170 and a fine vertical adjustment assembly 185. The coarse vertical adjustment assembly 170 includes a hand wheel 172, a threaded rod 174, a rod receiver 176 connected to the transmission 148 by way of a mounting plate 178, and a rod bearing 180 connected to an extension 182 of the table 160. The rod receiver 176 is threadedly engaged to the threaded rod 174, and allows the operator to manually extend or withdrawn the driveshaft 142 along its longitudinal axis to position the welding head 223 in a generally proper location with respect to the annular valve seat 18 by turning hand wheel 172. Finally, rod 174, mounting plate 178, and table 160 also form a torque-counteracting structure which insures that all of the torque generated by drive motor 144 will be used to angularly move the driveshaft 146. The fine vertical adjustment assembly 185 includes an electric motor 187 which is engaged to a worm gear assembly (not shown) by way of a coupling gear 191. Like angular adjustment motor 144, the electric motor 187 of the fine vertical adjustment assembly 185 is also connected to the output of microprocessor 73 by way of a cable. The coarse and fine vertical adjustment assemblies 170 and 185 and fiberscope 233 allow the operator to place the welding head 233 in a proper initial position with respect to the annular valve seat 18 by manually turning the hand wheel 172 of the coarse vertical adjustment assembly 170 and by manually actuating the electric motor 187 of the fine vertical adjustment assembly 185. After the operator succeeds in placing the welding head 223 in such a proper initial position, microprocessor 73 is actuated. The preprogrammed "electronic template" stored within the memory of the microprocessor 73 allows the microprocessor 73 to methodically "sweep" the arc welder 224 of the welding head 223 around the annular valve seat 18 in order to build a configuration of overlapping beads of metal to form a new sealing layer 19 onto the annular valve seat 18. However, in order for the electrode 229 of the arc welder 224 to follow the rounded contour of the annular valve seat 18, some means must be provided for moving the welder 224 in the radial direction, as well as the angular and axial directions. To this end, the positioning assembly 142 includes a radial adjustment assembly 195.

Figure 8:
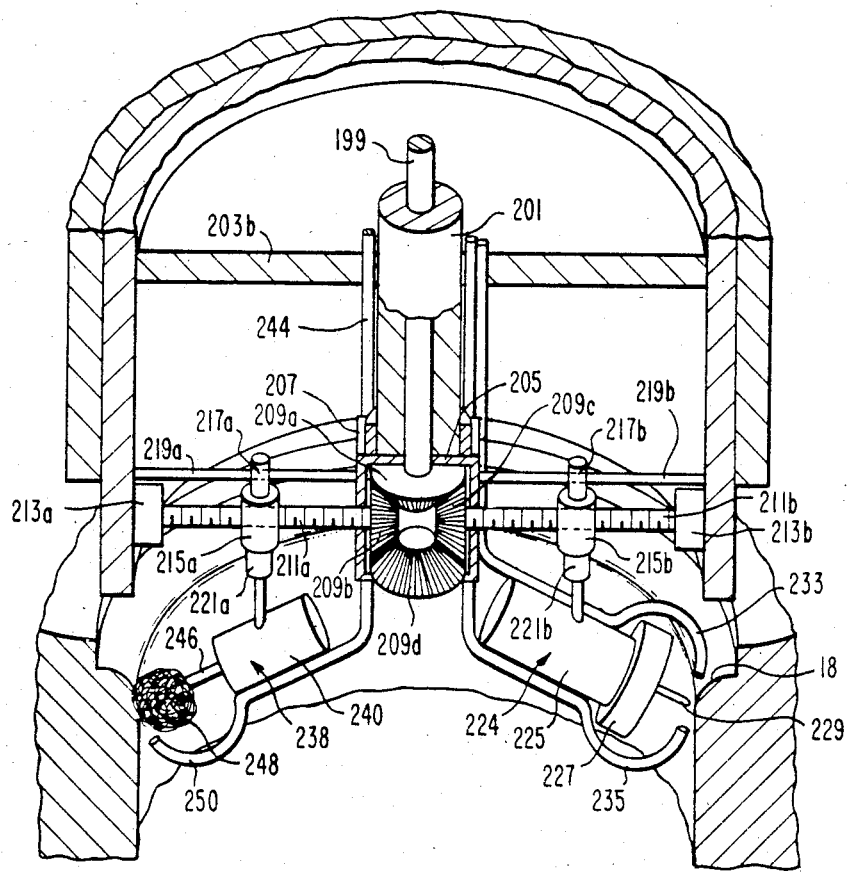
FIG. 8 is a perspective view of the welding head and the radial adjustment assembly of the invention.

With reference now to FIGS. 7 and 8, the radial adjustment assembly 195 is formed from an electric motor 197 which is electrically connected to the output of the microprocessor 73, and mechanically connected to an axial adjustment shaft 199 by means of a mechanical transmission (not shown) which may be any one of a number of commercially available transmission devices. Axial adjustment shaft 199 is concentrically disposed within the previously discussed driveshaft 142 and is aligned with the axis of rotation of the valve seat 18. The shaft 199 is also rotatable within a surrounding shaft housing 201 which is maintained in concentric alignment within the driveshaft 142 by means of a pair of center alignment members 203a, 203b which are connected to the inner walls of the driveshaft 42 and the outer wall of the shaft housing 201. As may best be seen with reference to FIG. 8, the terminal end of the axial adjustment shaft 199 is mechanically coupled to a bevel gearbox 205. Specifically, the shaft 199 is connected to the freely-rotatable bevel gear 209a within the bevel gearbox 205, while the top wall of the gearbox 205 is rigidly connected to the terminal end of the shaft housing 201 by means of a coupling 207. The teeth of bevel gear 209a mesh with the teeth of the two vertically oriented bevel gears 209b, 209c. Bevel gear 209b is connected to threaded rod 211a, which in turn is journalled into bearing 213a, while bevel gear 209c is connected to threaded rod 211b, which in turn is journalled into bearing 213b. The radial adjustment assembly 195 includes two opposing riding nuts 215a, 215b which ultimately move the brush 238 and the arc welder 224 of the welding head 233. Each of the opposing riding nuts 215a, 215b includes centrally-disposed bores (not shown) which are threadedly engaged to the rods 211a, 211b. Additionally, each of the riding nuts 215a, 215b includes an upwardly extending lug having a bore 217a, 217b through which an alignment rod 219a, 219b slidably extends. Finally, each of the riding nuts 215a, 215b includes a downwardly-extending mounting member 221a, 221b which is mechanically connected to the brush 238 and arc welder 224 of the welding head 233, respectively.

When the axial adjustment shaft is rotated clockwise by electric motor 197, both of the threaded rods 211a, 211b are likewise rotated clockwise by virtue of the intermeshing between upper bevel gear 209a and side bevel gears 209b and 209c. Consequently, both of the riding nuts 215a, 215b (along with brush 238 and arc welder 223) are radially withdrawn toward the gearbox 205, which in turns moves the arc welder 223 and brush 238 away from the annular valve seat 18. Conversely, when axial adjustment shaft 199 is rotated counterclockwise, riding nuts 215a, 215b are radially extended away from the bevel gearbox 205, which in turn moves the brush 238 and arc welder 223 closer to the rounded shoulder of the annular valve seat 18. The provision of the alignment rods 219a, 219b which slidably extend through bores 217a, 217b in the tabs of the riding nuts 215a, 215b insures that all of the rotational motion imparted by the axial adjustment shaft 199 will be converted into radial motion along the longitudinal axes of the threaded rods 211a, 211b.

The welding head 223 of the welding assembly 140 includes the previously mentioned arc welder 224 and the brush 238. Arc welder 224 is generally formed from a cylindrical housing 225 which terminates in a gas cup 227 having a centrally-disposed electrode 229 protruding therethrough. Arc welder 224 further includes a solid wire feeder (not shown) for feeding chromium-steel wire to the electrode 229 as the arc welder 224 is swept around the annular valve seat 18 in 360° arcs. Finally, the arc welder 224 includes the previously mentioned fiberscope 233, as well as a fume suction hose 235. The optical input end of the fiberscope 233 is disposed near the end of the centrally-disposed electrode 229 so that the operator may visually determine when the electrode 229 is in welding engagement with the annular valve seat 18, while the output end of the fiberscope 233 is coupled to the previously mentioned television camera 96. The input end of the fume suction hose 235 is likewise disposed near the end of the electrode 229 of the welder 224, while the output end is connected to a vacuum unit 236. Suction hose 235 withdraws fumes generated during the welding operation which could otherwise obscure or obstruct the view of the electrode through the fiberscope 233. The brush 238 includes a cylindrical housing 240 for housing an electric motor (not shown). The motor is electrically connected to a power source (not shown) via a cable (also not shown). The output shaft 246 of the electric motor is connected to a wire wheel 248 which removes impurities from the beads of welded material which are placed around the valve seat 18 by the arc welder 224. Like the arc welder 224, the brush 238 also includes a fiberscope 250 whose input end is oriented near the end of the wire wheel 248 so that the operator may observe the effectiveness of the wheel 248 in removing impurities from the beads of metal. As was the case with the arc welder fiberscope 233, the output end of the brush fiberscope 250 is optically connected to the previously mentioned television camera 96.

In the initial step of the operation of the invention, the turbine generator is first shut down, and allowed to cool off. Next, the stem and internal mechanism 23 of the valve to be refurbished is completely removed. The resilient, heat-resistant plug 110 is then inserted through the valve stem bore 15 and plugged into the valve nozzle 22 in the position illustrated in FIG. 5. Next, the universal mounting means 40 is connected onto the valve stem connector 31 by aligning the radially elongated stud-receiving bores 44a–44h with the studs 35a, 35b, etc. of the valve stem connector 31, centering the circular opening 46 of the mounting means 40 with the center line of the annular valve seat 18 by means of a centering gauge, and tightening the plate member 42 of the mounting means 40 in this centered position by means of nuts 36a, 36b, etc.

In the next step of the operation, the housing 78 of the machining assembly 70 is detachably connected onto the circular flange 50 of the universal mounting means 40 by means of the previously described vitrolic coupling 48. After this is accomplished, the operator places the machining bit 100 into a proper location with respect to the rounded shoulder of the annular valve seat 18 by manually turning the hand wheel 117 of the coarse vertical adjustment assembly 115, and manually actuating the electric motor 132 of the fine vertical adjustment assembly 130 until the view from the fiberscope 194 indicates that the edge of the machining bit 100 is in a proper initial position with respect to the valve seat 18. The microprocessor 73 is then activated, and proceeds to automatically grind out the worn sealing layer 19 of the valve seat 18 by simultaneously operating the drive motor 72 and the electric motor 132 of the fine vertical adjustment assembly in accordance with a preprogrammed "electronic template".

After the grinding step has been completed, the machining assembly 70 is removed from the universal mounting means 40, and the welding assembly 140 is detachably connected thereon, again by means of the previously described vitrolic coupling 48. The entire steam chest 1 is then preheated to 400° F., in accordance with industry-wide practice. After the desired heating temperature has been attained, the operator again manually utilizes both the coarse and fine vertical adjustment assemblies 170 and 185, the electric motor 197 of the radial adjustment assembly 195, and the fiberscopes 233 and 250 in order to place the arc welder 224 and the brush 238 into a proper starting position. After this has been accomplished, the microprocessor 73 is actuated in order to automatically rebuild the sealing layer 19 of the annular valve seat 18 by selectively actuating the angular adjustment motor 144, the electric motor 187 of the fine vertical adjustment assembly 185, and the electric motor 197 of the radial adjustment assembly 195, so that the arc welder 224 rebuilds the sealing layer 19 of the annular valve seat 18 by depositing a plurality of overlapping metallic beads onto the support shoulder 20 of the valve seat 18 in accordance with another preprogrammed "electronic template". The resulting, overlapping array of metallic beads 252 are illustrated in cross-section in FIG. 9.

Figure 9:
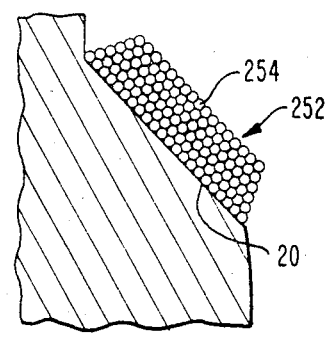
FIG. 9 is a partial cross-sectional side view of the valve seat illustrated in FIG. 6, wherein the sealing layer of the valve seat has been removed and replaced with a plurality of metal beads fused thereon by the welding head of the welding assembly.

The microprocessor 73 utilizes a three-step procedure in laying the array of metallic beads 252 illustrated in FIG. 9. First, the microprocessor 73 simultaneously actuates the arc welder 224 and the angular drive motor 144, and operates both so that the arc welder 224 deposits a single bead 254 of chromium steel which covers a 360° arc around the valve seat 18. After the arc welder 224 completes this circular sweep, the microprocessor 73 deactuates it, actuates the electric motor 242 of the brush 238, and reverses the direction of the angular drive motor 144 so that the arc welder is returned back into its initial position while the wire wheel 248 of the brush 238 removes any scale that may have formed on the newly deposited bead 254 of metal. After the arc welder 224 arrives back at its initial position, the microprocessor 73 deactuates the electric motor 242 of the brush 238, and actuates the electric motors 187 and 197 of both the fine vertical adjustment assembly 185 and the radial adjustment assembly 195 in order to reposition the electrode 229 of the arc welder 224 so that it will lay a new bead of metal around the annular valve 18 which is adjacent the previously deposited bead 254. After this is accomplished, the microprocessor 73 reactuates both the arc welder 224 and the angular adjustment motor 144, and repeats the 360° arcuate sweep and brush-cleaning cycle previously described. These steps are repeated until a new sealing layer 19 formed from approximately six layers of metallic beads 254 are deposited around the annular valve seat 18.

In the last steps of the operation, the valve seat 18 is stress-relieved in accordance with industry-wide practice. The welding assembly 140 is then removed from the universal mount 140, and the machining assembly 170 are again detachably mounted onto the universal mount 140 after the machining bit 100 used in the grinding operation has been replaced with a new, form-fitting bit which matches the desired final contour of the valve seat 18. Excess metal is then removed from the new sealing layer 19 formed from the overlapping layer beads 254 utilizing the same general process which was used in the grinding operation. If necessary, the completed valve seat may then be lapped in order to bring the final contour of the seat 18 into conformance with the desired final contour. Finally, the metal chips created during the refurbishing process are vacuumed out of the valve chamber 17, and the plug 110 is removed.

I claim as my invention:

1. Apparatus for remotely refurbishing a generally circular valve seat of a valve, comprising:
   (a) a welding assembly having a welding head for depositing a circular bead of metal around the valve seat, and a positioning assembly connected to said welding head and detachably mountable onto the valve body for axially, angularly and radially positioning the welding head along a desired point of the axis of rotation of the generally circular valve seat, and
   (b) a control means operatively connected to said positioning assembly for controlling the angular, radial and axial movement of the welding head relative to the generally circular valve seat, including:
      (i) a microprocessor electrically connected to the positioning assembly which has a memory for storing movement instructions for the positioning assembly so that, once said welding head is initially positioned at a starting position with respect to the valve seat, said welding assembly sequentially deposits at least one bead of welding material around the valve seat, and
      (ii) means for remotely visually observing said welding head within said valve body for allowing a welding operator to place said welding head at said starting position prior to the commencement of said movement instruction by said microprocessor, and to visually monitor the movement of said welding head after the commencement of said movement instructions.

2. The apparatus defined in claim 1, wherein said positioning assembly includes a rotatable shaft which is movable along its longitudinal axis for angularly and axially moving the welding head relative to the generally circular valve seat.

3. The apparatus defined in claim 2, wherein said positioning assembly further includes a radial adjustment assembly connected to the rotatable shaft for radially extending and withdrawing the welding head relative to the generally circular valve seat, wherein said radial adjustment assembly is remotely driven by a motor means located outside of the valve body.

4. The apparatus defined in claim 3, wherein said shaft and said radial adjustment assembly are each operatively connected to an electric motor, and wherein said microprocessor of said control means is electrically connected to each of the electric motors.

5. The apparatus defined in claim 3, further including a means for plugging the valve seat to prevent metal filings from falling through said valve seat.

6. The apparatus defined in claim 5, wherein said plugging means is a plug formed from a resilient material.

7. The apparatus defined in claim 1, further comprising a machining assembly for grinding down the valve seat before the welding assembly deposits metal thereon, and a mounting means for detachably mounting both the positioning assembly and the machining assembly onto the valve body.

8. The apparatus defined in claim 7, wherein said mounting means includes a clamp means for detachably connecting the positioning assembly and machining assembly to the valve body.

9. The apparatus defined in claim 7, wherein the valve body includes a valve stem connector, and wherein said mounting means is attachable to said valve stem connector.

10. The apparatus defined in claim 7, wherein said machining assembly includes a drive means having a rotatable shaft, and a first machining bit which is detachably connectable to the rotatable shaft for grinding down the valve seat.

11. The apparatus defined in claim 10, wherein said machining assembly additionally grinds off excess metal from the valve seat after the welding assembly deposits at least one circular bead of metal thereon.

12. The apparatus defined in claim 11, wherein said machining assembly further includes a second machining bit which is detachably connectable to said shaft for grinding off excess metal.

13. The apparatus defined in claim 1, wherein said monitoring means for remotely visually observing said welding head includes a fiberscope optically connected to a television camera.

14. The apparatus defined in claim 1, wherein said welding assembly further includes a means for removing fumes which result from a deposition of a bead of metal around the valve seat.

15. The apparatus defined in claim 1, wherein said welding assembly further includes a brush for removing impurities from the resulting beads of metal.

16. The apparatus defined in claim 15, wherein said positioning assembly includes a radial adjustment assembly for radially extending and withdrawing both said welding head and said brush from the generally circular valve seat.

17. Apparatus for remotely refurbishing a generally circular valve seat of a valve, comprising:
 (a) a welding assembly including a welding head for depositing a circular bead of metal around the valve seat, and a positioning assembly detachably connectable to the body of said valve for moving the welding head around the valve seat, wherein said positioning assembly includes:
  (i) a rotatable shaft which is aligned with and movable along the axis of rotation of the generally circular valve seat, for angularly and axially moving said welding head;
  (ii) a radial adjustment assembly connecting said welding head to said shaft for radially moving said welding head relative to said valve seat, and
  (iii) a source of electrically operated motive power located outside of said valve body which is operatively connected to both said shaft and said radial adjustment assembly, and
 (b) a control means electrically connected to said source of motive power for controlling the angular, axial and radial movement of the welding head around the valve seat, which includes:
  (i) a microprocessor which has a memory for storing movement instructions for the positioning assembly so that once said welding head is initially positioned at a starting position with respect to the valve seat, said welding assembly sequentially deposits at least one bead of welding material around the valve seat, and
  (ii) means for remotely visually observing said welding head within said valve body for allowing a welding operator to place said welding head at said starting position prior to the commencement of said movement instruction by said microprocessor and to visually monitor the movement of said welding head after the commencement of said movement instructions.

18. The apparatus defined in claim 17, further comprising a machining assembly for grinding down the valve seat before the welding assembly deposits metal thereon, and a mounting means for detachably mounting both the positioning assembly and the machining assembly onto the valve body.

19. The apparatus defined in claim 18, wherein said machining assembly also removes excess metal from said welding bead after the completion of the welding operation.

20. The apparatus defined in claim 19, wherein said machining assembly includes a drive means having a rotatable shaft, and first and second machining bits, each of which is detachably connectable to said shaft, for grinding down the valve seat before and after the welding operation, respectively.

21. The apparatus defined in claim 18, wherein said valve body includes a valve stem connector, and wherein said mounting means is attachable to said valve stem connector.

22. The apparatus defined in claim 18, wherein said mounting means includes a clamp means for detachably connecting said positioning assembly onto the valve body.

23. The apparatus defined in claim 17, wherein said means for remotely visually observing said welding head includes a fiberscope optically connected to a television camera.

24. Apparatus for remotely refurbishing a generally circular valve seat of a valve having both a valve stem and a valve stem connector connecting the stem to the body of the valve, comprising:
 (a) a mounting means mountable onto the valve stem connector on the body of the valve;
 (b) a welding assembly having a welding head for depositing a circular bead of metal around the valve seat, wherein said welding head includes a scale removing means for removing the impurities from the circular bead after it has been deposited onto the seat; and
 (c) a positioning assembly detachably mountable onto the mounting means for moving the welding head around the valve seat, wherein said positioning assembly includes:
  (i) a rotatable shaft which is aligned with and movable along the axis of rotation of the valve seat for angularly and axially moving said welding head and said scale removing means;
  (ii) a radial adjustment assembly connecting said welding head to said shaft for radially moving said welding head and said scale removing means relative to said valve seat including first and second rotatable threaded shafts, and first and second opposed riding nuts, engaged to said first and second threaded shafts, respectively, for supporting and simultaneously moving said welding head and said scale removing means;
  (iii) a source of electrically operated motive power operatively connected to said shaft, said radial adjustment assembly, and said scale removing means, and
 (d) a control means for controlling the movement of the welding head around the circumference of the generally circular valve seat, including:
  (i) a microprocessor which has a memory for storing movement instructions for the positioning assembly so that once said welding head initially positioned at a starting position with respect to the valve seat, said welding assembly sequentially deposits at least one bead of welding material around the valve seat, and
  (ii) means for remotely visually observing said welding heat within said valve body for allowing a welding operator to place said welding head at said starting position prior to the commencement of said movement instruction by said microprocessor, and to visually monitor the movement of said welding head after the commencement of said movement instructions.

25. A process for refurbishing a generally circular valve seat of a valve with a welding assembly including a welding head, a positioning assembly having motor means for angularly and radially moving the welding head along the axis of rotation of the valve seat, means for remotely observing the position of said welding head within the body of the valve, and a microprocessor electrically connected to said motor means and having a memory for storing movement instructions for the positioning assembly, comprising the sequential steps of:
  (a) disassembling the valve to provide access to the valve seat;
  (b) grinding down the valve seat;
  (c) detachably mounting the welding assembly onto the body of the valve;
  (d) using the positioning assembly and the remote observation means to radially position the welding head adacent to the valve seat at an initial starting position along the axis of rotation of the valve seat;
  (e) automatically depositing at least one head of metal around the valve seat by actuating the microprocessor to instruct the position assembly to angularly move the welding head around the circumference of the valve seat, and
  (f) monitoring the operation of the welding head as the beads are deposited around the valve seat through the remote observation means.

26. The process defined in claim 25, further including the step of automatically depositing a plurality of beads of metal around the valve seat by angularly moving the welding head completely around the valve seat, then moving the welding head to a different point along the axis of rotation of the valve seat, and again rotating the welding head around the circumference of the valve seat.

27. The process defined in claim 26, further including the step of grinding away excess metal from the beads of metal which the welding head deposits upon the valve seat.

28. The process defined in claim 27, wherein said excess metal is ground down by a machining assembly having a drive unit detachably connectable onto the body of the valve, and a machining bit.

29. The process defined in claim 25, wherein the remote observation means includes a fiberscope optically connected to a television camera.

30. The process defined in claim 25, further including the step of removing any impurities off the resulting beads by a brushing means.

31. The process defined in claim 25, wherein the valve seat is ground down by means of a machining assembly including a drive unit which is detachably mountable onto the body of the valve, and a machining bit.

32. The process defined in claim 25, wherein the valve includes a valve stem and element, and wherein said valve is first disassembled to provide access to the valve seat by removing the valve stem and element.

33. A process for refurbishing the valve seat of a valve in a steam chest, comprising the sequential steps of:
  (a) removing the valve stem from the valve stem connector on the body of the valve;
  (b) attaching a mounting means including a clamp onto the valve stem connector;
  (c) detachably mounting a machining assembly onto the mounting means having a first machining bit;
  (d) grinding down the valve seat with said first machining bit;
  (e) detachably mounting onto the mounting means a welding assembly having a positioning assembly and a welding head, a remote observation means, an electrically operated motor means mechanically connected to the positioning assembly, and a microprocessor electrically connected to said motor means which has a memory for storing movement instructions angularly and radially moving said welding head around selected points along the axis of rotation of the generally circular valve seat;
  (f) positioning said welding head into a selected initial position next to said valve seat by manually operating said positioning assembly while remotely visually observing said welding head;
  (g) automatically depositing a plurality of overlapping beads of metal around the valve seat with the welding head and positioning assembly by actuating the microprocessor, which implements the movement instructions by rotating the welding head around the valve seat in a 360° arc, moving the welding head to a different selected point along the axis of rotation of the valve seat, and again moving the welding head along a 360° arc;
  (h) monitoring the automatic welding operation carried out in step (g) by the remote observation means, and
  (i) detaching the welding assembly and removing any excess metal from the metal beads circumscribing the valve seat.

34. The process defined in claim 33, wherein the position of the welding head is visually monitored by means of a fiberscope optically connected to a television camera.

35. The process defined in claim 33, further including the step of removing any impurities which form on a bead after said welding head has deposited said bead around the valve seat.

36. The process defined in claim 33, further including the step of plugging the valve seat before grinding down the valve seat in preparation for the welding operation in order to prevent metal filings from falling through the valve seat.

* * * * *